United States Patent [19]

Yagi

[11] Patent Number: 4,881,049

[45] Date of Patent: Nov. 14, 1989

[54] QAM MODULATOR/DEMODULATOR

[75] Inventor: Manabu Yagi, Tokyo, Japan

[73] Assignee: NEC Corporation, Tokyo, Japan

[21] Appl. No.: 177,281

[22] Filed: Apr. 4, 1988

[30] Foreign Application Priority Data

Apr. 3, 1987 [JP] Japan ................................. 62-82752

[51] Int. Cl.[4] ...................... H04L 27/20; H04L 27/22
[52] U.S. Cl. .................................... 332/103; 329/304;
375/39; 375/67; 375/86
[58] Field of Search ...................... 375/39, 42, 53, 67,
375/80, 81, 83, 86, 94; 329/50, 122, 124; 332/16
R, 17, 19, 21, 22, 23 R

[56] References Cited

U.S. PATENT DOCUMENTS

4,549,142 10/1985 Yoshida ................................. 329/50
4,571,549 2/1986 Lods et al. ......................... 332/16 R
4,665,532 5/1987 Fukuda et al. ......................... 375/19

Primary Examiner—Siegfried H. Grimm
Attorney, Agent, or Firm—Sughrue, Mion, Zinn, Macpeak & Seas

[57] ABSTRACT

A digital signal transmission system adopting a quadrature amplitude modulation and demodulation principle and feasible for large capacity data transmission in which a number of levels are used. Each of a modulating and a demodulating device of the system is constructed to shift the phase difference between two carrier waves by a suitable angle of $\Delta\theta$ radian from $\pi/2$ radian. The tuning phase in the demodulating device is limited to one so as to allow a bit error rate characteristic to remain constant.

8 Claims, 7 Drawing Sheets

QAM MODULATOR/DEMODULATOR

BACKGROUND OF THE INVENTION

The present invention relates to a digital signal transmission system including a modulator and a demodulator, which is based on quadrature amplitude modulation (QAM) and, more particularly, to a digital signal transmission system feasible for large capacity data transmission which uses a great number of levels.

In a carrier wave digital transmission systems art, an attempt has recently been made to increase the frequency utilization efficiency for the purpose of implementing high efficiency data transmission. In a QAM signal transmission system, for example, a current trend is toward the use of greater number of levels and, indeed, the use of 256 levels is under investigation. As regards a digital signal transmission system, when a modulated signal received by a demodulating device is synchronously detected for demodulation, which modulation phase of the modulated signal is represented by a demodulated digital code is not determined unconditionally, as well known in the art. Due to such uncertainty of tuning phase, the combination of P and Q channels changes between a modulating and a demodulating device. Since the linear distortion in a transmission system usually affects each of the P and Q channels to a different degree, the uncertainty of tuning phase causes a demodulated wave-form to change from an optimum wave-form to other various kinds of wave-forms. Consequently, the bit error rate characteristic of a demodulated digital code does not remain constant and fluctuates over a considerable range, affecting the operation and maintenance of digital radio communication channels.

It has been customary to minimize the influence of faulty demodulation stated above by, for example, adjusting the circuitry of a baseband transmission system or by using an equalizer, thereby rendering the bit error rate characteristic constant. However, this kind of implementation is effective only when the number of levels used is as small as sixteen or so. In the case that the number of levels is increased to sixty-four or more with the intension of increasing transmission capacity, the influence of linear distortion in the transmission system becomes so subtle that even the circuitry adjustment of the baseband transmission system, use of an equalizer or like implementation cannot eliminate the faulty modulation problem.

The prior art as described above is disclosed in, for example, "THE 8-LEVEL PSK MODEM WITH COSINE ROLL-OFF SPECTRUM FOR DIGITAL MICROWAVE COMMUNICATIONS" by Y. Tan et al, ICC 76, Vol. II, pages 29-13 to 29-18, "MULTI-LEVEL PSK MODEMS FOR TDMA SYSTEM" by T. Noguchi et al, EASCON '75 RECORD, pages 139-A to 139-F, and U.S. Pat. No. 4,549,142 (Yoshida).

SUMMARY OF THE INVENTION

It is, therefore, an object of the present invention to provide a digital signal transmission system capable of maintaining a constant bit error rate characteristic when the number of levels is increased for increasing transmission capacity.

It is another object of the present invention to provide a generally improved digital signal transmission system.

A digital signal transmission system of the present invention comprises at least a modulating device for effecting substantially quadrature amplitude modulation and including a phase shifter which applies phase shift processing to two carrier waves which are different in phase from each other so as to produce the carrier waves, the phase shifter effecting a phase shift of $(\pi/2 - \Delta\theta)$ radian or $(\pi/2 + \Delta\theta)$. The digital signal transmission system further comprises a demodulating device for producing a demodulated signal from a received modulated signal by quadramplitude demodulation and including a phase shifter for applying phase shift processing to two recovered carrier waves which are different in phase from each other so as to produce the recovered carrier waves, the phase shifter effecting a phase shift of $(\pi/2 - \Delta\theta)$ radian or $(\pi/2 + \Delta\theta)$ radian.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

To better understand the present invention, a brief reference will be made to a prior art digital signal transmission system using the quadrature amplitude modulation and demodulation principle, shown in FIGS. 1A and 1B. The system is generally constituted by a modulating device and a demodulating device which are shown in FIGS. 1A and 1B, respectively.

Figure 1A:
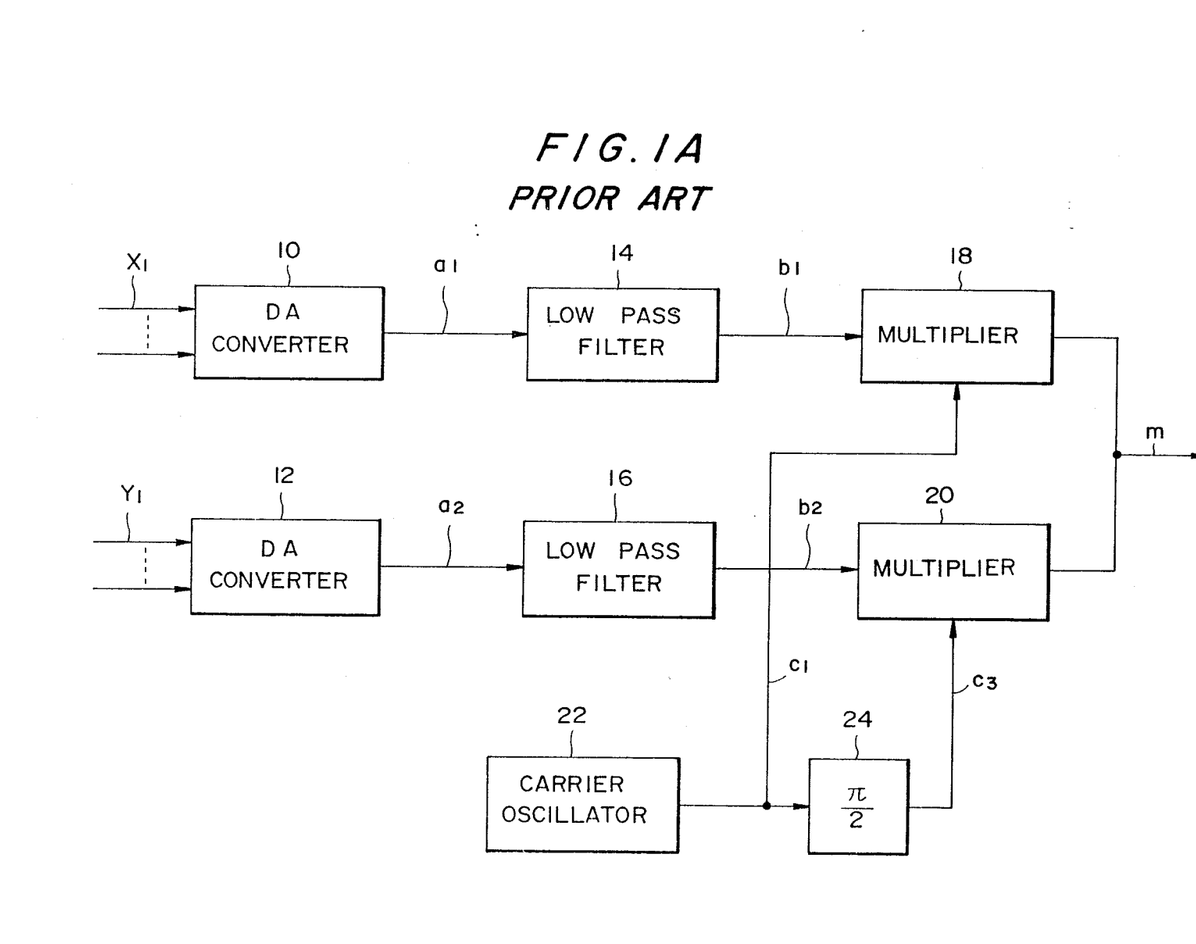
FIGS. 1A and 1B are schematic block diagrams showing in combination a prior art digital signal transmission system.

Basically, the modulating device shown in FIG. 1A includes digital-to-analog (DA) converters 10 and 12, low pass filters 14 and 16, multipliers 18 and 20, a carrier oscillator 22, and a phase shifter 24. Data signals $X_1$ and $Y_1$ are two streams of N-level digital signals and are respectively assumed to be a P channel signal and a Q channel signal which is orthogonal to the P channel signal. The data signals $X_1$ and $Y_1$ are respectively applied to the DA converters 10 and 12 to be thereby converted into analog signals $a_1$ and $a_2$. The analog signals $a_1$ and $a_2$ are respectively limited by the low pass filters 14 and 16 to become baseband signals $b_1$ and $b_2$. These baseband signals $b_1$ and $b_2$ are applied to one input of the multipliers 18 and 20, respectively.

The carrier oscillator 22 generates a carrier wave $c_1$ having a predetermined frequency. The carrier wave $c_1$ is fed to the other input of the multiplier 18 and the phase shifter 24. The phase shifter 24 applies a phase shift of $\pi/2$ radian to the carrier wave $c_1$ so as to produce a carrier wave $c_3$ which is different in phase from the carrier wave $c_1$ by $\pi/2$ radian, the carrier wave $c_3$ being routed to the other input of the multiplier 20. That is, the phase shifter 24 serves to produce two different carrier waves $c_1$ and $c_2$ which are different in phase by $\pi/2$ radian. The multiplier 18 modulates the amplitude of the carrier wave $c_1$ by the baseband signal $b_1$ while the multiplier 20 modulates the amplitude of the carrier wave $c_3$ by the baseband signal $b_2$. A composite signal of the outputs of the multipliers 18 and 20, i.e., a modulated signal m is shown in a diagram in FIG. 2. Specifically, FIG. 2 is representative of a signal distribution defined by a 4-phase phase modulation and indicates that predetermined points $a_5$, $b_5$, $c_5$ and $d_5$ which lie in the respective quadrants of the rectangular coordinates as defined by perpendicular P and Q axes are the signal points.

Figure 1B:
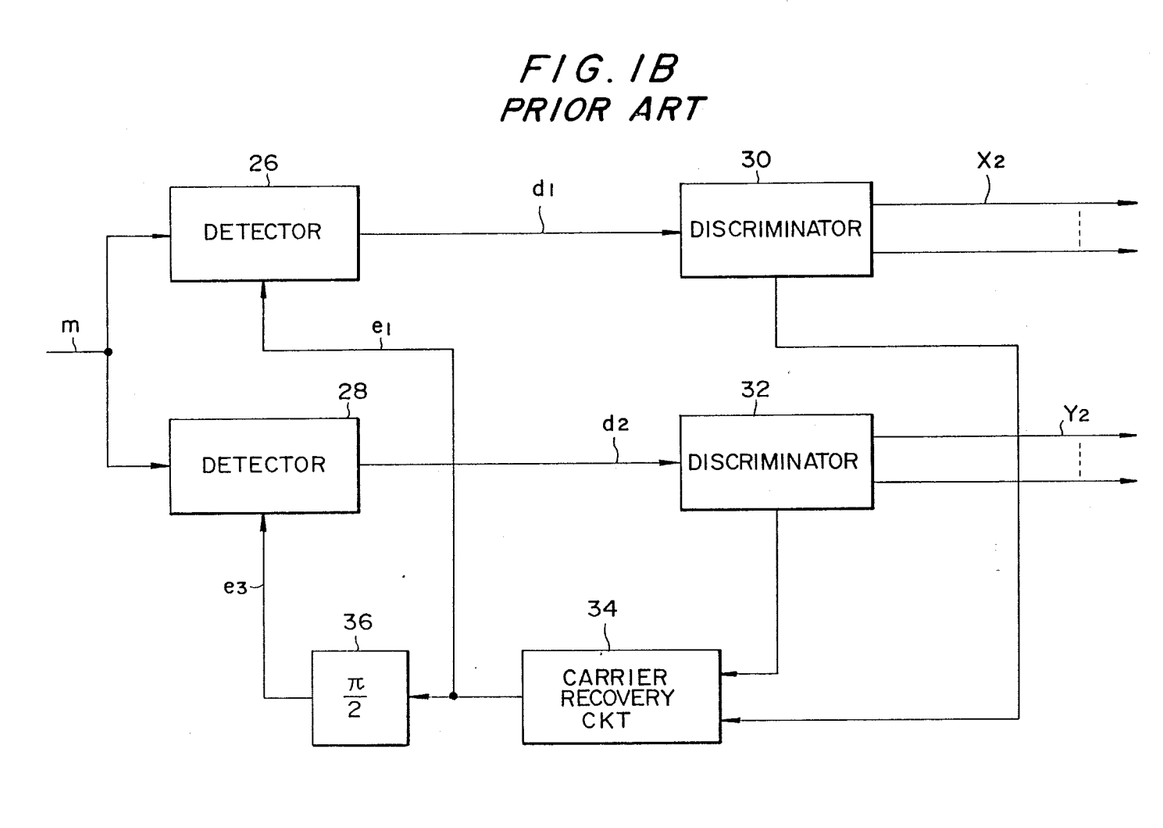

As shown in FIG. 1B, the demodulating device basically comprises detectors 26 and 28, discriminators (or analog-to-digital converters) 30 and 32, a carrier recovery circuit 34, and a phase shifter 36. The modulated signal m received is applied to one input of the detectors 26 and 28 in parallel. Receiving error signals from the discriminators 30 and 32, the carrier recovery circuit 34 recovers the carrier wave and feeds the recovered carrier wave $e_1$ to the other input of the detector 26 and the phase shifter 36. The phase shifter 36 shifts the phase of the carrier wave $e_1$ by $\pi/2$ radian to produce a carrier wave $e_3$ whose phase is different by $\pi/2$ radian from the carrier wave $e_1$. This carrier wave $e_1$ is applied to the other input of the detector 28. That is, the phase shifter 36 functions to produce two different carrier waves $e_1$ and $e_3$ which are different in phase by $\pi/2$ radian. The detector 26 synchronously detects the modulated signal m based on the recovered carrier wave $e_1$, the resulting baseband signal $d_1$ being fed to the discriminator 30. Likewise, the detector 28 synchronously detects the modulated signal m based on the recovered carrier wave $e_3$ and applies the resulting baseband signal $d_2$ to the discriminator 32.

Figure 2:
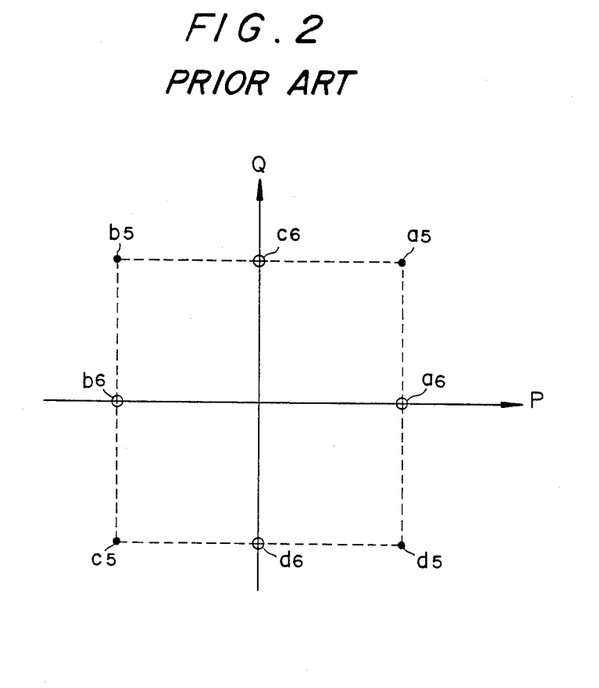
FIG. 2 is a signal vector diagram representative of a modulated signal which is particular to the prior art system of FIG. 1.

When projected, the signal points $a_5$, $b_5$, $c_5$ and $d_5$ shown in FIG. 2 lie on the P axis as represented by points $a_6$ and $b_6$ and on the Q axis as represented points $c_6$ and $d_6$. These projected points $a_6$, $b_6$, $c_6$ and $d_6$ are the sampling points of an eye pattern for demodulation, i.e. discrimination levels. The discriminators 30 and 32 discriminate that eye pattern to thereby respectively demodulate the P channel data signal $X_2$ and the Q channel data signal $Y_2$ while, at the same time, feeding the error signals which have been mentioned earlier to the carrier recovery circuit 34.

A drawback with such a prior art digital modulation nd demodulation system is that the bit error rate characteristic of a demodulated digital code fluctuates over a considerable range, as previously discussed.

A digital signal transmission system in accordance with the present invention is free from the above-stated drawback. In principle, a modulating and a demodulating device of the system of the present invention each includes a phase shifter which effects a phase shift of $(\pi/2 - \Delta\theta)$ radian or $(\pi/2 + \Delta\theta)$ radian. The modulating device, therefore, produces a modulated signal by applying substantially quadrature or psuedo-quadrature amplitude modulation to carrier waves which are different in phase by $(\pi/2 - \Delta\theta)$ or $(\pi/2 + \Delta\theta)$ radian by use of two streams of multi-level baseband signals. On the other hand, the demodulating device produces those baseband signals by synchronously detecting the modulated signal by recovered carrier waves which are also different in phase by $(\pi/2 - \Delta\theta)$ radian or $(\pi/2 + \Delta\theta)$ radian and by discriminating the modulated signal with respect to multiple levels. In the case that the tuning phase differs from the modulating device to the demodulating device, the bit error rate in the demodulating device increases and, to cope with this occurrence, control performed by a control loop is shifted in a direction for reducing the bit error rate. This allows tuning to be effected only in a single phase and thereby insures demodulation with a constant bit error rate characteristic. Here, since the deviation "$+\Delta\theta$" or "$-\Delta\theta$" should be greater than the discrimination levels of nearby signals, the value of $\Delta\theta$ is increased with the decrease in the number of levels and decreased with the increase in the same. For this reason, the system of the present invention is advantageously applicable to large capacity data transmission which uses a great number of levels.

Figure 3A:
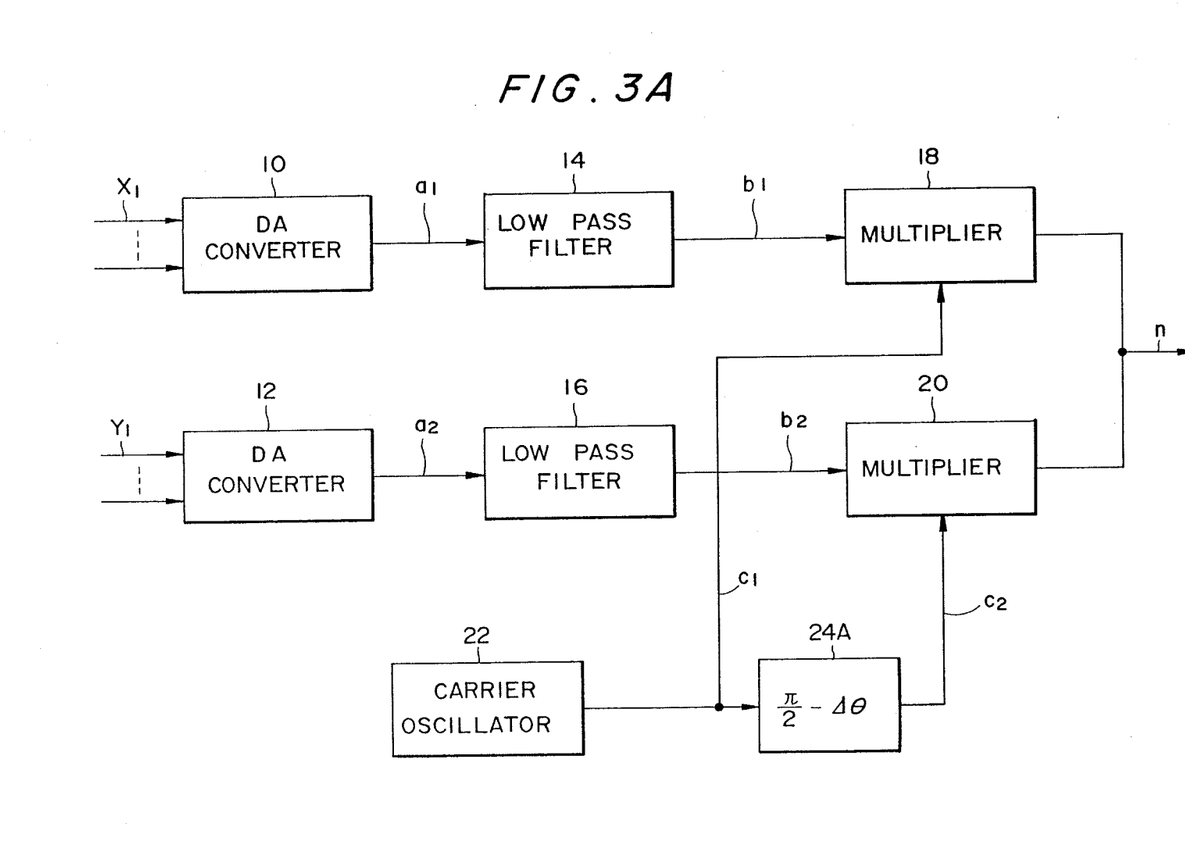
FIGS. 3A and 3B are schematic block diagrams showing in combination a digital signal transmission system in accordance with the present invention.
Figure 3B:
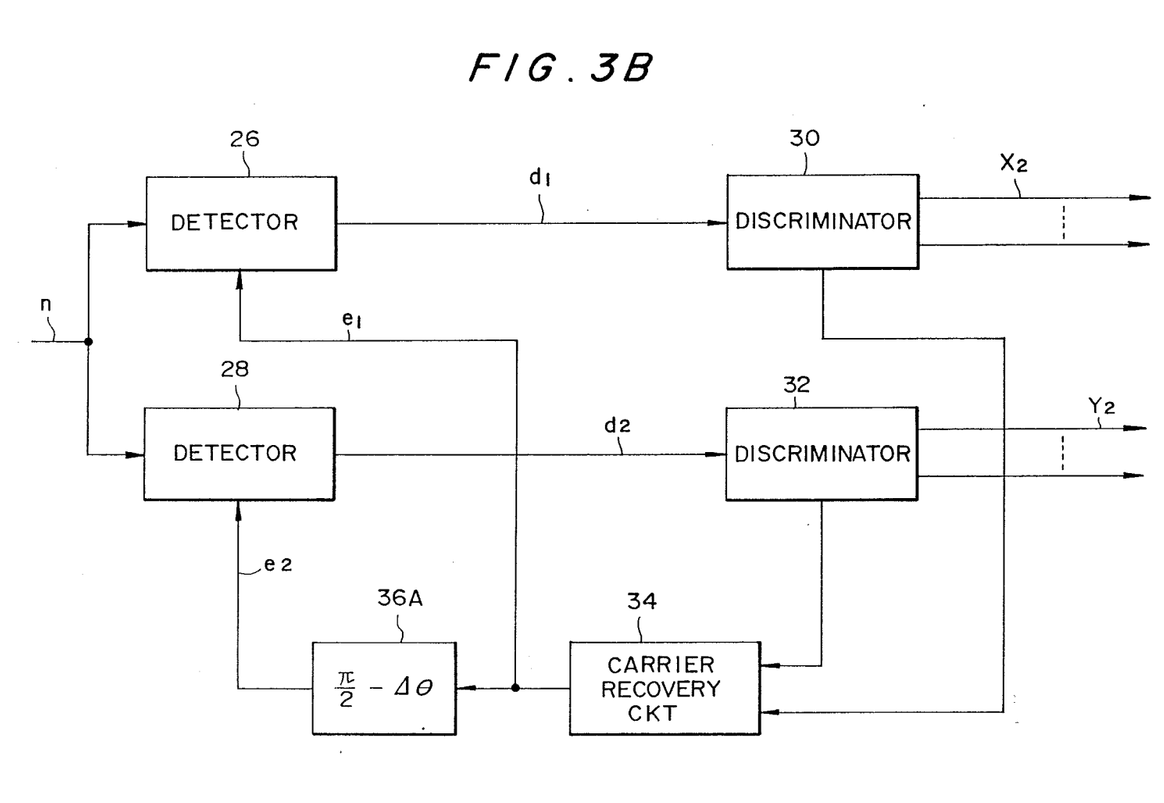
Figure 4:
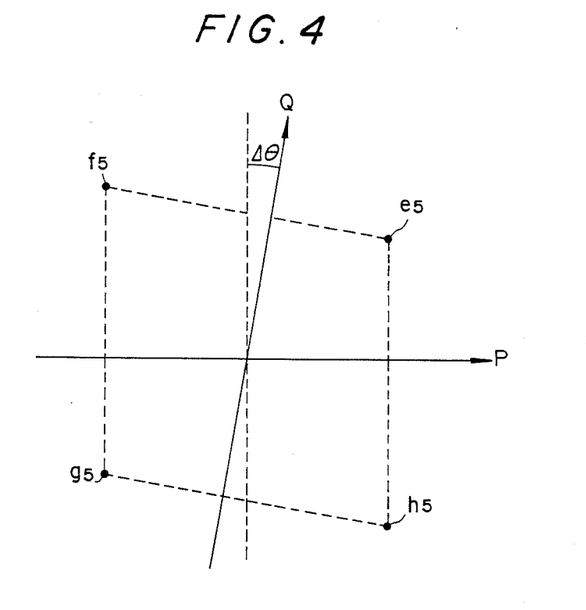
FIG. 4 is a signal vector diagram representative of a modulated signal which is produced by a modulating device of FIG. 3A.

Referring to FIGS. 3A and 3B, a specific construction of the digital signal transmission system embodying the present invention is shown. In these figures, the blocks which share the same functions as those of FIGS. 1A and 1B are designated by like reference numerals, and details thereof will not be described to avoid redundancy. A modulating device shown in FIG. 3A includes a phase shifter 24A while a demodulating device shown in FIG. 3B includes a phase shifter 36A. In the illustrative embodiment, the phase shifters 24A and 36A effect phase shift by the same amount of $(\pi/2 - \Delta\theta)$ radian. Specifically, while the phase shifter 24A produces carrier waves $C_1$ and $C_2$ which are different in phase by $(\pi/2 - \Delta\theta)$ radian, the phase shifter 36A produces recovered carrier waves $e_1$ and $e_2$ which are different in phase by $(\pi/2 - \Delta\theta)$ radian. Therefore, a modulated signal n outputted by the modulating device has signal points as shown in FIG. 4. Again, FIG. 4 is representative of the case of 4-phase phase modulation. By comparing FIG. 4 with FIG. 2, it will be apparent that the P and Q axes of FIG. 4 are deviated by $\Delta\theta$ radian from their orthogonal condition. In FIG. 4, since signal points $e_5$, $h_5$, $g_5$ and $f_5$ are repesented by those points at which perpendiculars individually intersect the P and Q axes, a quadrilateral defined by those signal points has a different shape from the quadrilateral of FIG. 2.

Figure 5A:
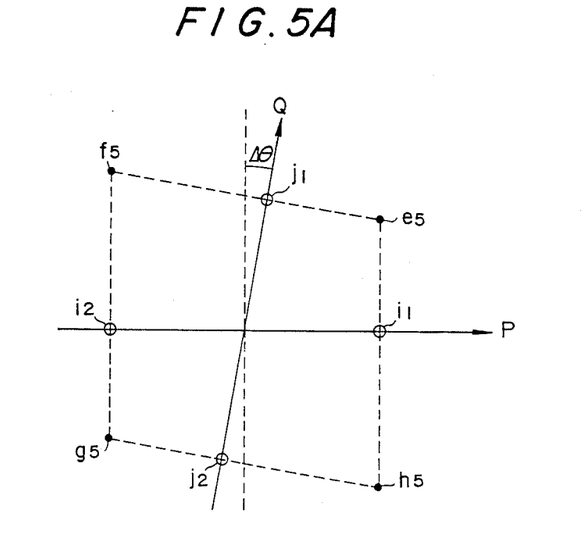
FIGS. 5A and 5B are signal vector diagrams each being representative of a demodulated signal which is produced by a demodulating device of FIG. 3B.
Figure 5B:
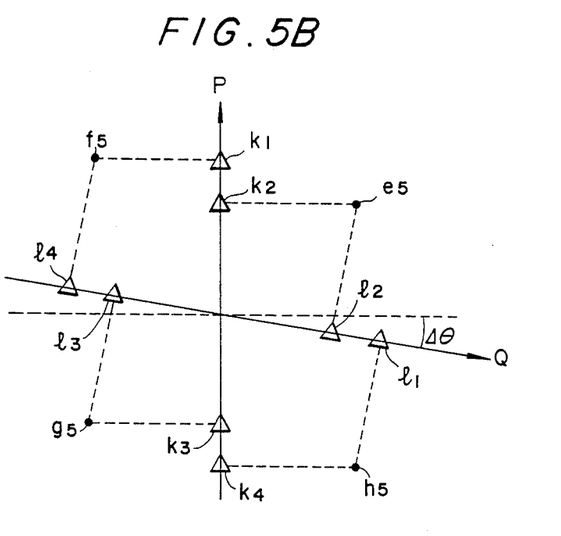

FIGS. 5A and 5B are signal vector diagrams each showing signal points which are associated with the demodulating device. As shown in FIG. 5A, so long as the tuning phase of the demodulating device in the event of demodulation is the same as that of the modulating device, signal points are distributed in exactly the same manner as in FIG. 4. Hence, perpendiculars extending from signal points $e_5$ and $f_5$ toward the Q axis intersect the Q axis at the same point $j_1$, and perpendiculars extending from signal points $h_5$ and $g_5$ toward the Q axis intersect the Q axis at the same point $j_2$. Further, perpendiculars extending from the signal points $e_5$ and $h_5$ toward the P axis intersect the P axis at the same point $i_1$, and perpendiculars extending from the points $f_5$ and $g_5$ toward the P axis intersect the P axis at the same point $i_2$. Such a condition indicates that the demodulated signal is accurate. On the other hand, when the tuning phase of the demodulating device at the time of demodulation is different from that of the modulating device, i.e., when the P channel signal is pulled in as the Q channel signal, signal points are distributed as shown in FIG. 5B. In the diagram of FIG. 5B, a perpendicular extending from the signal point e₅ intersects the P axis at a point k₂ while a perpendicular extending from the signal point f₅ intersects it at a point k₁ which is not coincident with the point k₂. This is true for the other signal points also. That is, four different discrimination levels $k_1$ to $k_4$ exist on the P axis, and four different discrimination levels $l_1$ to $l_4$ exist on the Q axis. The resulting demodulated signal is deviated from the accurate demodulated signal, i.e., the bit error is increased. Hence, the control loop does not remain stable and, instead, searches for and settles at a stable condition in which signal points are distributed as shown in FIG. 5A.

It will be seen from the above that the crux of the present invention is preventing the control loop from becoming stable except for a single particular tuning phase. It should be born in mind that the diagram of FIG. 5B is simply intended to facilitate an understanding of the principle of the present invention and not to show that the control loop does not become stable in the condition of FIG. 5B. In order that the control loop may be prevented from becoming stable in the condition of FIG. 5B, the value of $\Delta\theta$ has to be further increased to such an extent that the nearby discrimination levels such as $l_2$ and $l_3$ on the Q axis are replaced with each other. For four levels or so, the value of $\Delta\theta$ need be extremely large, i.e., the value of $\Delta\theta$ may be reduced as the number of levels is increased. For example, in the case of a system using 256 levels, $\Delta\theta$ required is as small as $\pi/60$ radian (3 degrees).

Figure 6:
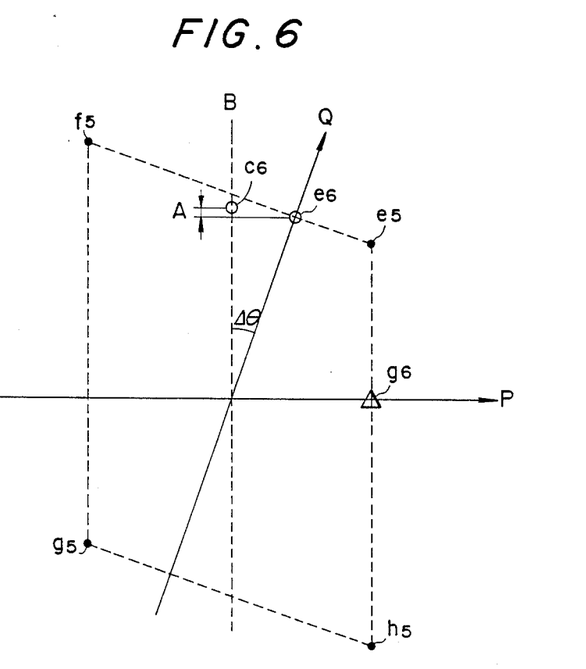
FIG. 6 is a diagram representative of a relationship between the angle of deviation $\Delta\theta$ and the power transmitted.

Referring to FIG. 6, there is shown a relationship between the deviation angle $\Delta\theta$ and the power transmitted (average). In the figure, the B axis corresponds to the conventional Q axis while $C_6$ is representative of a discrimination level on the conventional Q axis. Further, $e_6$ is representative of a discrimination level in accordance with the present invention which is defined by projecting the signal point $e_5$ and $f_5$ onto the Q axis of the present invention, which is inclined by $\Delta\theta$ radian relative to the B axis. As shown, the present invention inherently involves a loss of power transmitted which corresponds to the difference A between the two discrimination levels $C_6$ and $e_6$, and this limits the applicable range of the present invention. For example, when the number N of levels used is 256, $\Delta\theta$ is $\pi/60$ radian (3 degrees) and, therefore, the loss of power associated with the difference A is as small as 0.45 dB. When the number N of levels used is 64, $\Delta\theta$ is $\pi/28$ radian and, therefore, the power loss is as small as 0.97 dB. However, when the number of levels is sixteen, $\Delta\theta$ is $\pi/12$ radian (15 degrees) which means a loss of 2.39 dB resulting in poor efficiency. It follows that the present invention is advantageously applicable to quadrature amplitude modulation and demodulation systems in which the number of levels is sixty-four or more.

In summary, it will be seen that the present invention provides a digital signal transmission system in which the tuning phase in a modulating device is limited to one allowing the bit error rate characteristic to remain constant. This is because the modulating device as well as a demodulating device is constructed to shift the phase difference of two carrier waves by a suitable angle of $\Delta\theta$ radian from $\pi/2$ radian. In addition, since the angle of $\Delta\theta$ required becomes smaller as the number of levels used is reduced, the system of the present invention is feasible for large capacity data transmission.

Various modifications will become possible for those skilled in the art after receiving the teachings of the present disclosure without departing from the scope thereof.

What is claimed is:
1. A digital signal transmission system comprising:
a modulating device for effecting substantially quadrature amplitude modulation and including a phase shifter which applies phase shift processing to a carrier wave so as to produce two carrier waves which are different in phase from each other; and
a demodulating device for producing a demodulated signal from a received modulated signal by quadramplitude demodulation and including a phase shifter for applying phase shift processing to a recovered carrier wave so as to produce two recovered carrier waves which are different in phase from each other;
said phase shifters each effecting a phase shift of $(\pi/2-\Delta\theta)$ radian or $(\pi/2+\Delta\theta)$ radian where $\Delta\theta$ is a predetermined phase angle.

2. A digital signal transmission system as claimed in claim 1, in which when the number of levels used is 64, $\Delta\theta$ is greater than $\pi/28$ radian.

3. A digital signal transmission as claimed in claim 1, in which when the number of levels used is 256, $\Delta\theta$ is greater than $\pi/60$ radian.

4. A digital signal transmission system comprising at least a modulating device for effecting substantially quadrature amplitude modulation and including a phase shifter which applies phase shift processing to a carrier wave so as to produce two carrier waves which are different in phase from each other, said phase shifter effecting a phase shift of $(\pi/2-\Delta\theta)$ radian or $(\pi/2+\Delta\theta)$ radian where $\Delta\theta$ is a predetermined phase angle.

5. A digital signal transmission system as claimed in claim 4, in which when the number of levels used is 64, $\Delta\theta$ is greater than $\pi/28$ radian.

6. A digital signal transmission system as claimed in claim 4, in which when the number of levels used is 256, $\Delta\theta$ is greater than $\pi/60$ radian.

7. A digital signal transmission system comprising:
means for generating a first carrier wave;
means for phase-shifting the first carrier wave by $(\pi/2+\Delta\theta)$ radian or $(\pi/2-\Delta\theta)$ radian where $\Delta\theta$ is a predetermined phase angle, thereby providing a second carrier wave; and
means for modulating the first and second carrier waves in response to first and second signals, respectively and combining them to provide a substantially quadrature amplitude modulated carrier wave.

8. A digital signal transmission system comprising:
means for generating a first carrier wave;
means for shifting the first carrier wave by $(\pi/2+\Delta\theta)$ radian or $(\pi/2-\Delta\theta)$ radian where $\Delta\theta$ is a predetermined phase angle, thereby providing a second carrier wave;
means for modulating the first and second carrier waves in response to first and second signals, respectively and combining them to provide a substantially quadrature amplitude modulated carrier wave;
means for recovering a third carrier wave from the modulated carrier wave;
means for phase-shifting the third carrier wave by $(\pi/2+\Delta\theta)$ radian or $(\pi/2-\Delta\theta)$ radian where $\Delta\theta$ is said predetermined phase angle, thereby providing a fourth carrier wave; and
means for detecting the modulated carrier wave in response to the third and fourth carrier waves, thereby providing the first and second signals.

* * * * *